United States Patent [19]
Hanamoto et al.

[11] Patent Number: 5,186,579
[45] Date of Patent: Feb. 16, 1993

[54] APPARATUS FOR CONTROLLING DIRECTION OF UNDERGROUND EXCAVATOR

[75] Inventors: Tadayuki Hanamoto; Norio Takahashi, both of Hiratsuka, Japan

[73] Assignee: Kabushiki Kaisha Komatsu Seisakusho, Tokyo, Japan

[21] Appl. No.: 777,560
[22] PCT Filed: Apr. 19, 1991
[86] PCT No.: PCT/JP91/00521
  § 371 Date: Dec. 16, 1991
  § 102(e) Date: Dec. 16, 1991
[87] PCT Pub. No.: WO91/16525
  PCT Pub. Date: Oct. 31, 1991

[30] Foreign Application Priority Data
  Apr. 19, 1990 [JP] Japan .................. 2-101583

[51] Int. Cl.$^5$ .............................................. E21D 9/06
[52] U.S. Cl. ................................... 405/143; 405/138; 405/184; 175/26; 299/1.4
[58] Field of Search ................ 405/138, 141, 143, 154, 405/184; 299/1.05, 1.4; 175/26, 45, 61; 324/326, 339, 342, 346

[56] References Cited

U.S. PATENT DOCUMENTS

| | | | |
|---|---|---|---|
| 3,560,753 | 2/1971 | Beug et al. | 299/1.4 X |
| 4,273,468 | 6/1981 | Cyfka | 405/143 X |
| 4,311,411 | 1/1982 | Akesaka et al. | 405/184 |
| 4,513,504 | 4/1985 | Nussbaumer et al. | 405/184 X |

FOREIGN PATENT DOCUMENTS

| | | | |
|---|---|---|---|
| 287460 | 10/1988 | European Pat. Off. | 405/141 |
| 60-218290 | 10/1985 | Japan . | |
| 64-71996 | 3/1989 | Japan . | |
| 235793 | 9/1989 | Japan | 405/143 |
| 2-115492 | 4/1990 | Japan . | |
| 140393 | 5/1990 | Japan | 405/141 |
| 183087 | 7/1990 | Japan | 405/143 |
| 186097 | 7/1990 | Japan | 405/143 |
| 2-85199 | 11/1990 | Japan | 405/143 |
| 514052 | 7/1976 | U.S.S.R. | 405/143 |
| 2095720 | 10/1982 | United Kingdom | 405/138 |

OTHER PUBLICATIONS

"Application of Fuzzy Theory to Shield Tunnelling Machines", Keisoku to Seigyo, *Instrumentation and Control*, vol. 27, No. 11, Nov. 1988.

Primary Examiner—Dennis L. Taylor
Assistant Examiner—John Ricci
Attorney, Agent, or Firm—Spensley, Horn Jubas & Lubitz

[57] ABSTRACT

According to the present invention, there is disclosed an apparatus for controlling the direction of displacement of an underground excavator including a turnable jack to perform excavating operations in the underground region while controlling the direction of the same by turnably displacing a pilot jack, wherein a quantity of turnable actuation of the turnable jack in the vertical direction is determined by employing a fuzzy presumptive theory having two inputs and one output used therefor under conditions that a corrected pitching angle and a steering sensibility sensible in the vertical direction are taken as inputs and a quantity of turnable actuation of the turnable jack in the vertical direction is taken as an output, while a quantity of turnable actuation of the turnable jack in the horizontal direction is determined by employing the presumptive theory having two inputs and one output used therefor under conditions that a corrected yawing angle and a steering sensibility sensible in the horizontal direction are taken as inputs and a quantity of turnable actuation of the turnable jack in the horizontal direction is taken as an output. With the apparatus constructed as described above, a quantity of turnable actuation of the turnable jack can quickly be determined corresponding to variation of the nature of soil.

2 Claims, 8 Drawing Sheets 5,186,579

APPARATUS FOR CONTROLLING DIRECTION OF UNDERGROUND EXCAVATOR

TECHNICAL FIELD

The present invention relates to an apparatus for controlling the direction of displacement of an underground excavator such as an underground excavator having pipes each having a smaller diameter used therefor or the like by employing a fuzzy presumptive theory.

With respect to an underground excavator having pipes such as city water pipes, sewage pipes, power cable pipes or the like each having a smaller diameter used therefor for excavating the underground region while successively laying pipes in excavated holes, it is necessary that a pilot pipe is propelled by the underground excavator along a planned line for performing excavating operations. In view of the foregoing necessity, direction control for the underground excavator becomes very important.

However, as far as the underground excavator of the foregoing type is concerned, a controlling operation for controlling the direction of excavating operations to be performed is usually performed depending on operator's experiences as well as his six sense. For this reason, the current status is that an accuracy of the performed excavating operation differs depending on an operator's skill.

To obviate the foregoing problems, a proposal has been made in the industrial field of an underground excavator having pipes each having a larger diameter used therefor such as a shield excavator or the like with respect to employment of directional control to be executed depending on an operator's skill in accordance with a fuzzy theory for the underground excavator.

The direction control for the underground excavator in the horizontal direction in accordance with the fuzzy theory will be described below as an example. According to the fuzzy theory, it is assumed that four variables, i.e., a quantity DH of snake motion-shaped displacement of the underground excavator in the horizontal direction, a quantity $\Delta$ DH of variation of the snake motion-shaped displacement of the same in the horizontal direction, a deviation angle $\theta$H of the same in the horizontal direction and a quantity $\Delta$ $\theta$H of variation of the deviation angle of the same are taken as input variables, and a quantity $\Delta$ EH of adjustment of unidirectional squeezing of the underground excavator in the horizontal direction is taken as an output variable. Then, fuzzy control rules are prescribed corresponding to the four input variables in such a manner that a quantity $\Delta$ EH1 of adjustment derived from the control rule on the quantity DH of snake motion-shaped displacement of the underground excavator in the horizontal direction and the quantity $\Delta$ DH of variation of the snake motion-shaped displacement of the same as well as a quantity $\Delta$ EH2 derived from the fuzzy control rule on the deviation angle $\theta$H of the underground excavator in the horizontal direction and the quantity $\Delta$ $\theta$H of variation of the deviation angle on the same in the horizontal direction are determined. Thereafter, the two quantities as mentioned above are coupled to another fuzzy control rule in accordance with the following equation so as to determine a final quantity of adjustment, i.e., the quantity $\Delta$ EH of adjustment of the unidirectional squeezing of the underground excavator in the horizontal direction.

$$\Delta EH = \alpha \times \Delta EH1 + (1-\alpha) \times \Delta EH2 \qquad (1)$$

Therefore, the above-described conventional technology is concerned with a proposal on a fuzzy controller for executing directional control for shield excavating operations to be comparatively easily performed in conjunction with the directional control (this is because a shield excavator is propelled while scooping soil and gravel visually recognized in the desired direction of forward displacement thereof by operator's eyes). According to the conventional technology, a quantity of next adjustment to be executed by the fuzzy controller is determined based not only on a difference between the desired direction of forward displacement of the shield excavator and the direction practically assumed by the shield excavator but also on a quantity of variation of the aforementioned difference.

However, due to the fact that the above-described conventional technology is concerned with a shield excavator of which steering activity is not adversely affected by the present nature of soil so far, it can not be applied to an underground excavator having pipes each having a smaller diameter used therefor as it is. Specifically, the underground excavator having pipes each having a smaller diameter used therefor is squeezed by a reactive force derived from soil and gravel surrounding its pilot head during an excavating operation, and the foremost end of a pilot jack is displaced to the position where the reactive force of soil and gravel and the counter force of the underground excavator are balanced with each other. At this time, since the reactive force largely varies depending on the nature of soil, an angle to be corrected with respect to the direction assumed by the underground excavator corresponding to a quantity of turnable displacement of the same likewise largely varies depending on the nature of soil.

According to the conventional technology, since controlling operations for steering activities are performed by the fuzzy controller while conditions associated with the nature of soil are added to the fuzzy controller as parameters, there arises a problem that the controlling operations for steering activities can not practically be performed with high accuracy when the conventional technology is applied to an underground excavator having pipes each having a smaller diameter used therefor.

In addition, according to the conventional technology, since fuzzy presumption should be executed twice by the fuzzy controller, there arises another problem that it is practically difficult to correctly tune the membership functions and the control rules.

The present invention has been made with the foregoing background in mine and its object resides in providing an apparatus for controlling the direction of displacement of an underground excavator wherein the apparatus assures that a steering operation can be controlled with high accuracy, and moreover, membership functions and control rules can be tuned easily.

DIBCLOSURE OF THE INVENTION

According to the present invention, there is provided an apparatus for controlling the direction of displacement of an underground excavator including a turnable jack, wherein the apparatus comprises first detecting means for detecting horizontal deviation of the underground excavator relative to a planned line for excavating operations, vertical deviation of the same, a pitching angle assumed by the underground excavator and a yawing angle assumed by the same, second detecting means for detecting a quantity of turnable displacement of the underground excavator caused by the turnable jack not only in the vertical direction but also in the horizontal direction, first calculating means for determining a corrected pitching angle based on the pitching angle and the vertical deviation detected in the above-defined manner, second calculating means for determining a corrected yawing angle based on the yawing angle and the horizontal deviation detected in the above-defined manner, third calculating means for determining a difference between the preceding pitching angle and the present pitching angle, and moreover, detecting a steering sensibility sensible in the vertical direction based on the detected quantity of turnable displacement of the underground excavator in the vertical direction, fourth calculating means for determining a steering sensibility sensible in the horizontal direction based on a difference between the preceding yawing angle and the present yawing angle as well as the detected quantity of turnable displacement of the underground excavator in the horizontal direction, first fuzzy controlling means for determining a quantity of next turnable actuation of the turnable jack in the vertical direction in accordance with fuzzy rules in response to outputs from the first calculating means and the third calculating means, fuzzy rules being preset such that the corrected pitching angle and the steering sensibility sensible in the vertical direction determined in the above-defined manner are taken as premise variables and the quantity of next turnable actuation of the turnable jack in the vertical direction is taken as a conclusion variable, and second fuzzy controlling section for determining a quantity of next turnable actuation of the turnable jack in the horizontal direction in accordance with fuzzy rules in response to outputs from the first calculating means and the fourth calculating means, the fuzzy rules being preset such that the corrected yawing angle and the steering sensibility sensible in the horizontal direction determined in the above-defined manner are taken as premise variables and the quantity of next turnable actuation of the turnable jack in the horizontal direction is taken as a conclusion variable.

With the apparatus constructed as described above, a quantity of turnable actuation of the turnable jack is determined by employing a fuzzy presumptive theory having two inputs and one output used therefor. Specifically, with respect to the vertical direction, a corrected pitching angle assumed by the underground excavator and a steering sensibility sensible in the vertical direction are taken as inputs, and a quantity of turnable actuation of the turnable jack in the vertical direction is taken as an output. In addition, with respect to the horizontal direction, a corrected yawing angle and a steering sensibility sensible in the horizontal direction are taken as inputs, and a quantity of turnable actuation of the turnable jack in the horizontal direction is taken as an output.

As is apparent from the above description, according to the present invention, since the direction of displacement of the underground excavator having pipes each having a smaller diameter used therefor is controlled in association with turnable actuation of the turnable jack for controlling the direction of the same, particularly by detecting a grade of effective steering activity based on a steering sensibility, a quantity of turnable actuation of the turnable jack can be determined quickly corresponding to variation of the nature of soil. Such construction of the apparatus as mentioned above makes it possible for any well-trained operator to perform excavating operations with the underground excavator. In addition, since the fuzzy presumptive theory is constituted in a simple manner, the membership functions and the control rules can be tuned easily.

BEST MODE FOR CARRYING OUT THE INVENTION

Now, the present invention will be described in detail hereinafter with reference to the accompanying drawings which illustrate a preferred embodiment of the present invention.

Figure 3:
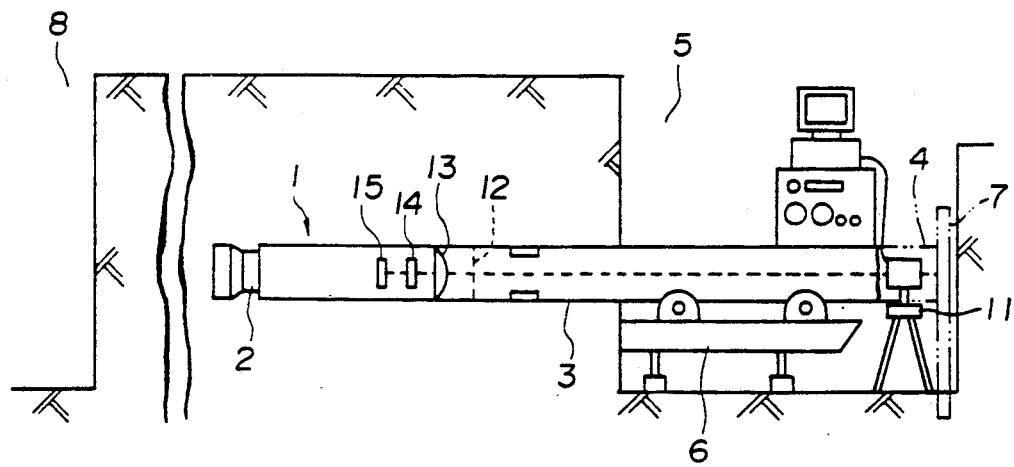
FIG. 3 is a side view which schematically illustrates the structure of an underground excavator having pipes each having a small diameter used therefor.

FIG. 3 schematically illustrates the structure of an underground excavator adapted to operate using a tube having a small diameter to which the present invention is applied. In the drawing, reference numeral 1 designates a pilot head, reference numeral 2 designates a pilot jack, reference numeral 3 designates a pilot pipe, reference numeral 4 designates a rear propelling jack for squeezing the pilot pipe 3, reference numeral 5 designates a starting shaft, and reference numeral 6 designates a rail for installing the rear propelling jack 4 and others thereon, reference numeral 7 designates a reactive force plate for obtaining a reactive force, reference numeral 8 designates a destination shaft, and reference numeral 11 designates a laser light transit unit.

With the underground excavator constructed as described above, a pilot hole is excavated with the pilot head 1 by increasingly expanding the pilot jack 2. Subsequently, a hole having a small diameter is excavated in the underground region by squeezing the pilot pipe 3 by activating the rear propelling jack 4 while retracting the pilot jack 2.

Figure 4:
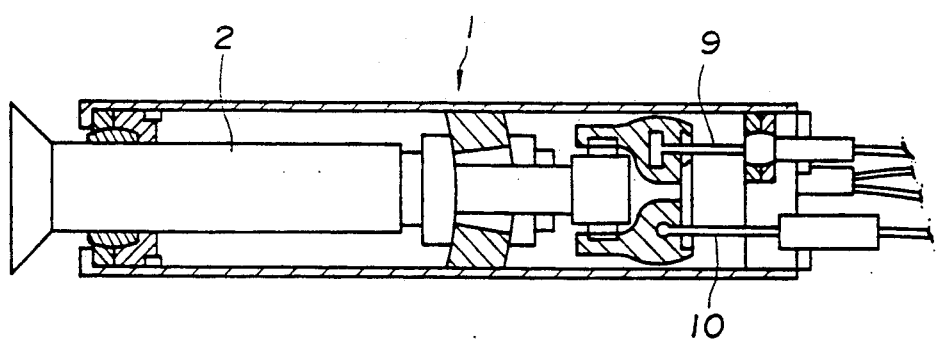
FIG. 4 is a sectional view of a pilot head for the underground excavator shown in FIG. 3, FIG. 5 and FIG. 6 are schematic views which illustrate an attitude angle assumed by the pilot head as well as positional deviation of the pilot head from a planned line for excavating operations, respectively

FIG. 4 is a sectional view which schematically illustrates the structure of the pilot head 1. The pilot jack 2 is turnably displaced in the upward/downward direction by actuating a vertically turnable jack 9. The vertically turnable jack 9 is operatively associated with a horizontally turnable jack (not shown) arranged at a right angle relative to the vertically turnable jack 9 in such a manner that the pilot jack 2 is turnably displaced in the horizontal direction by actuating the horizontally turnable jack. A quantity Y of turnable displacement of the vertically turnable jack 9 is detected by a vertical turnable displacement quantity potentiometer 10, while a quantity X of turnable displacement of the horizontally turnable jack is detected by a horizontal turnable displacement quantity potentiometer (not shown). In other words, a controlling operation for controlling the direction of displacement of the underground excavator is performed by controllably driving the two turnable jacks as mentioned above.

Figure 5:
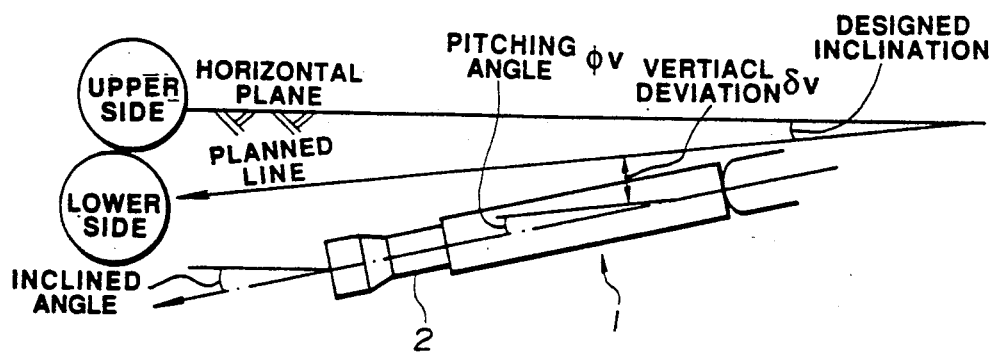
Figure 6:
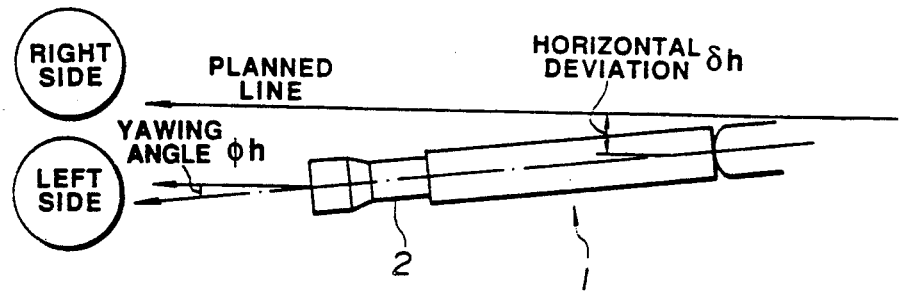

On the other hand, positional deviation of the pilot head 1 from two planned lines for excavating operations as well as an attitude to be assumed by the pilot head 1 are detected by the laser light transit unit 11 or the like as shown in FIG. 3. Specifically, as shown in FIG. 5 and FIG. 6, the positional deviation of the pilot head 2 from the planned lines and the attitude assumed by the pilot head 1 are represented by a deviation H and a pitching angle $\theta_p$ as seen in the vertical direction and a deviation L and a yawing angle $\theta_y$ as seen in the horizontal direction, and they are detected by the laser light transit unit 11. It should be noted that an inclination angle of the pilot head 1 relative to a horizontal plane is detected by an inclination meter (not shown) which is arranged in the pilot head 1.

In the shown case, the mechanism employed for measuring the deviations and the attitude angles as mentioned above with the aid of the laser light transit unit 11 is composed of the laser light transit unit 11, a target glass 12, a light collecting lens 13, a fore sensor 14 and a rear sensor 15, as shown in FIG. 3. With the aforementioned mechanism employed for measuring operations, a laser light outputted from the laser light transit unit 11 is received by the fore sensor 4 and the rear sensor 5 via the target glass 12 and the light collecting lens 13 so that the deviations and the attitude angles as mentioned above are determined based on the positions where the fore sensor 14 and the rear sensor 15 have received the laser light. In detail, the vertical deviation H and the horizontal deviation L are detected in response to an output from the fore sensor 14, while the pitching angle $\theta_p$ and the yawing angle $\theta_y$ are detected in response to an output from the rear sensor 15. Since an principle for measuring the deviations and the attitude angles as mentioned above is well known by any expert in the art, repeated description will not be required.

Figure 1:
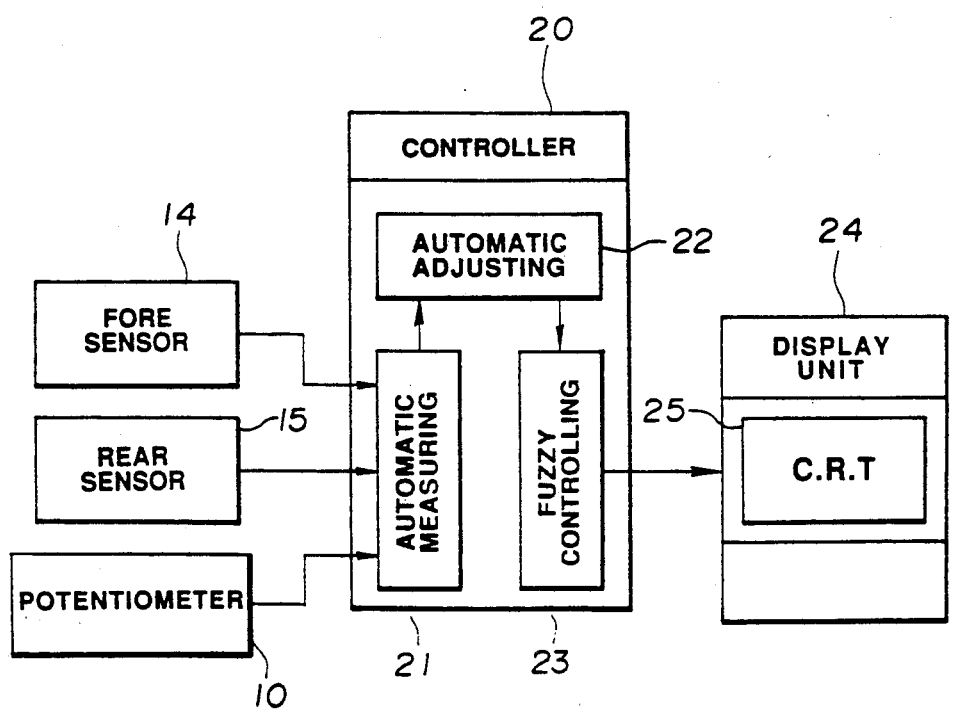
FIG. 1 is a block diagram which schematically illustrates the structure of an apparatus for controlling the direction of movement of an underground excavator in accordance with an embodiment of the present invention.
Figure 2:
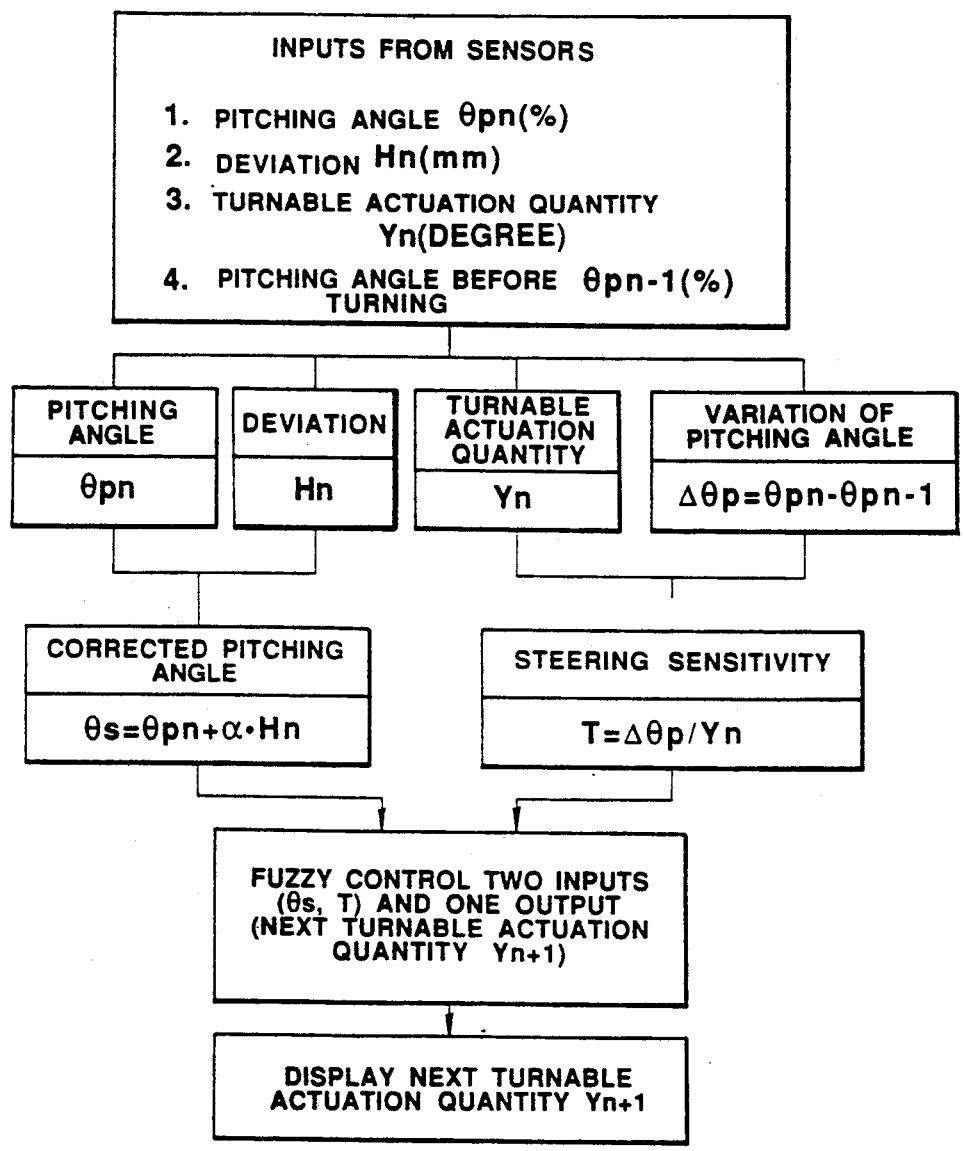
FIG. 2 is a flowchart which illustrates operations of the apparatus in accordance with the embodiment shown in FIG. 1.

FIG. 1 is a block diagram which schematically illustrates the structure of a control system for controlling the direction of displacement of the underground excavator, and FIG. 2 is a flowchart which shows functions to be executed by the underground excavator. It should be added that FIG. 2 shows only functions of the underground excavator in the vertical direction for the purpose of simplification.

Referring to the drawings, outputs from the fore sensor 14, the rear sensor 15, the vertical potentiometer 10 and the horizontal potentiometer are inputted into an automatic measuring section 21 in a controller 20. The automatic measuring section 21 is operated such that outputs from these sensors are received therein at every time when the underground excavator advances by a predetermined distance (e.g., 40 cm) so that they are subjected to A/D converting in the automatic measuring section 21, a vertical deviation $H_n$ and a horizontal deviation $L_n$ are determined in response to an output from the fore sensor 14, a pitching angle $\theta_{pn}$ and a yawing angle $\theta_{yn}$ are determined in response to an output from the rear sensor 15, a vertical turnable displacement quantity $X_n$ and a horizontal turnable displacement quantity $Y_n$ are then determined in response to output from the vertical potentiometer 10 and the horizontal potentiometer, and thereafter, values derived from the aforementioned determinations are outputted to an automatic adjusting section 22 in the controller 20. Incidentally, the small character designates the number of sampling operations which have been practically performed.

The automatic adjusting section 22 is operated such that a corrected pitching angle $\theta_{sn}$ is determined in accordance with the following equations based on the pitching angle $\theta_{pn}$ and the vertical deviation $H_n$ which have been inputted thereinto, and moreover, a corrected yawing angle $\theta_{rn}$ is likewise determined in accordance with the following equations based on the yawing angle $\theta_{yn}$ and the horizontal deviation $L_n$ inputted thereinto.

$$\theta_{sn} = \theta_{pn} + \alpha \cdot H_n$$

$$\theta_{rn} = \theta_{yn} + \beta \cdot L_n \quad (2)$$

where $\alpha$ and $\beta$ are a constant.

In addition, the automatic adjusting section 22 is operated such that a steering sensibility $T_n = \Delta\theta_{pn}/T_n$ sensible in the vertical direction is determined based on the vertical turnable displacement quantity $Y_n$ and a quantity $\Delta\theta_{pn} = \theta_{pn} - \theta_{pn-1}$ variation of the pitching angle $\theta_{pn}$, and moreover, a steering sensibility $S_n = \Delta\theta_{pn}/Y_n$ sensible in the horizontal direction is determined based on the horizontal turnable displacement quantity $X_n$ and a quantity $\Delta\theta_{yn} = \theta_{yn} - \theta_{yn-1}$ of variation of the yawing angle $\theta_{yn}$.

Generally, to assure that the underground excavator advances along the planned line, it is necessary that the present inclined state of the underground excavator coincides with the planned line so as to allow the inclined line of the underground excavator to extend in parallel with the planned line. However, at this time, since it is necessary that the positional deviation of the pilot head 1 from the planned line is reduced, the inclined line of the underground excavator is required to additionally deviate from the angle oriented in parallel with the planned line by a quantity corresponding to the aforementioned reduction of the positional deviation. The corrected pitching angle $\theta_{sn}$ and the corrected yawing angle $\theta_{rn}$ are determined in consideration of the aforementioned necessity and requirement.

A grade of effective steering activity, i.e., steering sensibilities differ depending on the nature of soil, and it can be determined with reference to a quantity of variation of the inclination of the pilot head 1 associated with the turnable actuation of the pilot jack 2. The steering sensibility $T_n$ in the vertical direction and the steering sensibility $S_n$ in the horizontal direction have been determined in consideration of the degree of effective steering activity as mentioned above.

Subsequently, the calculated values $\theta_{sn}$, $\theta_{rn}$, $T_n$ and $S_n$ are inputted into a fuzzy controlling section 23 in which quantities $X_{n+1}$ and $Y_{n+1}$ of next turnable actuation of the turnable jack 2 are calculated by a well-trained operator while performing a fuzzy controlling operation with the aid of the fuzzy controlling section 23 in the controller 20. Then, the quantities $X_{n+1}$ and $Y_{n+1}$ of next turnable actuation of the turnable jack 2 calculated in the above-described manner are displayed on the screen of a cathode-ray tube type monitor of a display outputting unit 24.

Next, a fuzzy controlling operation for controlling the direction of displacement of the underground excavator will be described in more detail with respect to the vertical direction.

The fuzzy controlling operation is performed under conditions that two variables, i.e., the corrected pitching angle $\theta_s$ and the steering sensitivity T are taken as inputs and a single variable of the quantity $Y_{n+1}$ of next turnable actuation of the turnable jack 2 is taken as an output.

Figure 7:
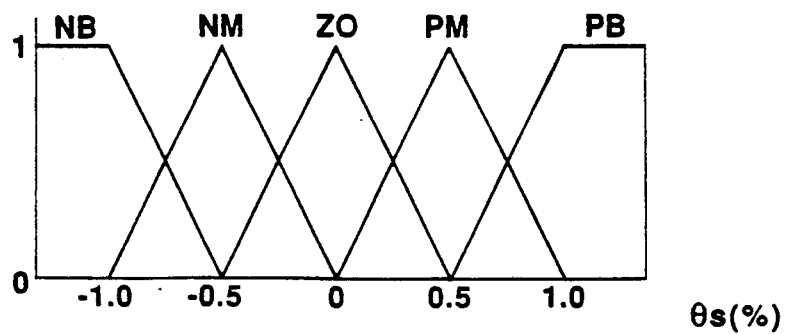
FIG. 7 to FIG. 9 are diagrams which illustrate membership functions, respectively.
Figure 8:
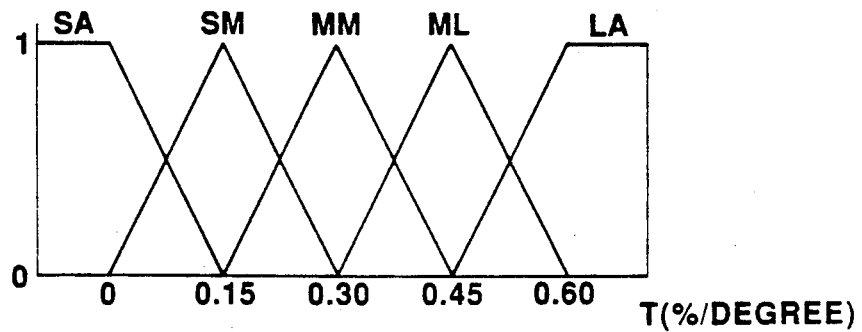
Figure 9:
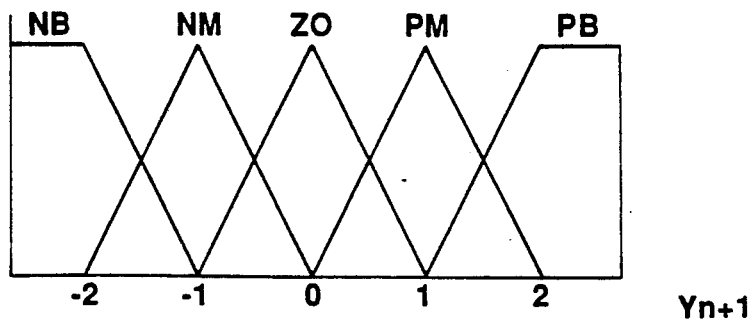

FIG. 7 is a diagram which illustrates a membership function of the corrected pitching angle $\theta_s$, FIG. 8 is a diagram which illustrates a membership function of the steering sensitivity T, and FIG. 9 is a diagram which illustrates a membership function of the quantity $Y_{n+1}$ of next turnable actuation of the turnable jack 2. In addition, fuzzy control rules are shown in the following table to represent a relationship among the memberships as mentioned above.

TABLE

| | $Y_n + 1$ | T | | | | |
|---|---|---|---|---|---|---|
| | | SA | SM | MM | ML | LA |
| $\theta_s$ | NB | PB | PB | PB | PM | PM |
| | NM | PB | PM | PM | PM | ZO |
| | ZO | ZO | ZO | ZO | ZO | ZO |
| | PM | NB | NM | NM | NM | ZO |
| | PB | NB | NB | NB | NM | NM |

Here, the fuzzy control rules are represented by the following equations.

$$IF \theta_s = \delta \text{ AND } T = \epsilon \text{ THEN } Y_n + 1 = \xi \quad (3)$$

In the equations, $\delta$, $\epsilon$ and $\xi$ represent membership functions which are associated with the corre teed pitching angle $\theta_s$, the steering sensitivity T and the quantity $Y_{n+1}$ of next turnable actuation of the turnable jack 2.

Next, calculations to be executed by the fuzzy control section 23 when $\theta_x$ is equal to $-0.25$ (%) and T is equal to 0.50 (degree) will be described below as an example.

The fuzzy control rules to be used with reference to the above table are represented by the following four equations.

$$IF \theta_{sn} = NM \text{ AND } T = ML \text{ THEN } Y_n + 1 = PS \quad (4)$$

$$IF \theta_{sn} = NM \text{ AND } T = LA \text{ THEN } Y_n + 1 = ZO \quad (5)$$

$$IF \theta_{sn} = ZO \text{ AND } T = ML \text{ THEN } Y_n + 1 = ZO \quad (6)$$

$$IF \theta_{sn} = ZO \text{ AND } T = LA \text{ THEN } Y_n + 1 = ZO \quad (7)$$

It is assumed that the above equations are solved by employing a minimum-maximum method based on the fuzzy presumptive theory, and final outputs are determined by employing a gravity center method.

Figure 10A:
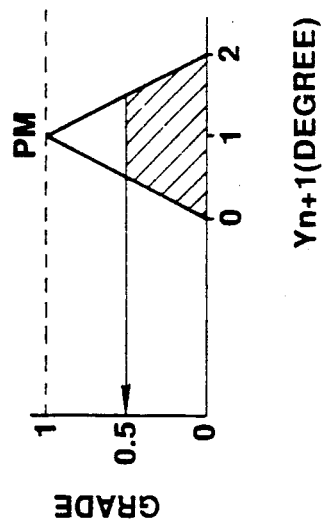
FIGS. 10A-C, 11A-C, 12A-C, 13A-C, and 14 are diagrams which schematically illustrate a calculating method to be practiced in accordance with a fuzzy presumptive theory, respectively.
Figure 10B:
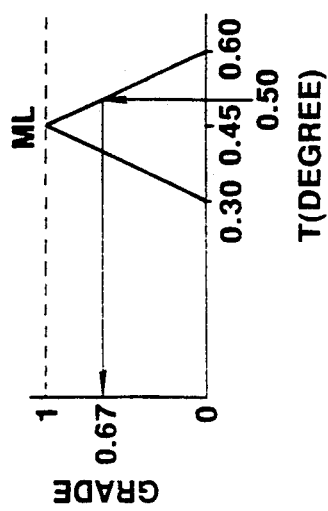
Figure 10C:
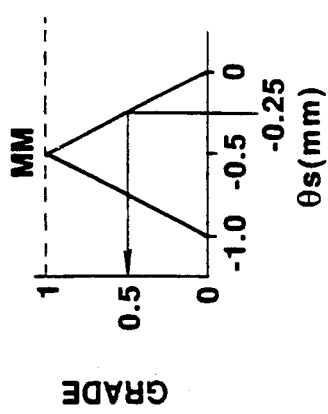

Specifically, among the above equations, the equation (4) is solved as illustrated in FIG. 10, and a grade of solution is represented by $Y_n+1=0.5$ when smaller one of $\theta_s=0.5$ and $T=0.67$ is selectively taken.

Figure 11A:
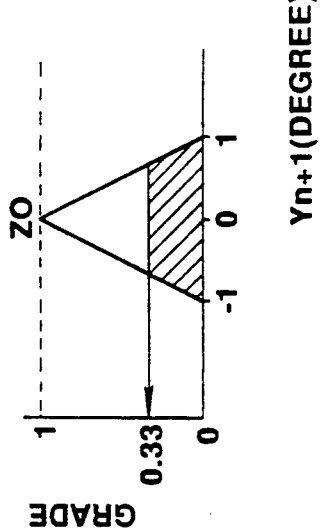
Figure 11B:
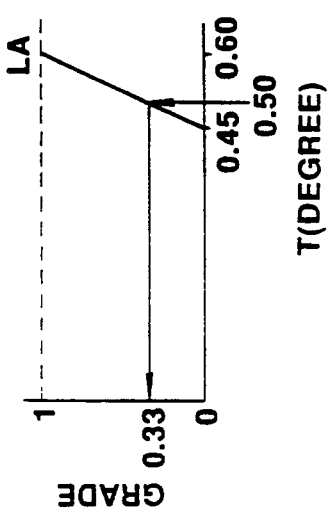
Figure 11C:
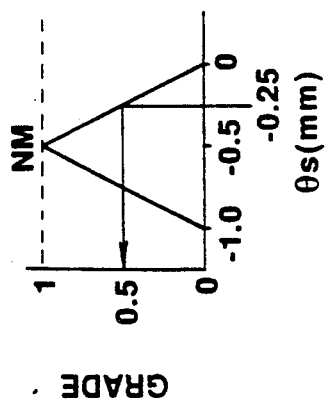

Next, the equation (5) is solved as illustrated in FIG. 11, and a grade of solution is represented by $Y_n+1=0.33$ when smaller one of $\theta_s=0.5$ and $T=0.33$ is selectively taken.

Figure 12A:
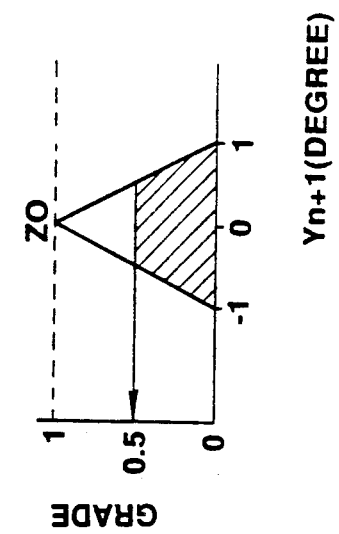
Figure 12B:
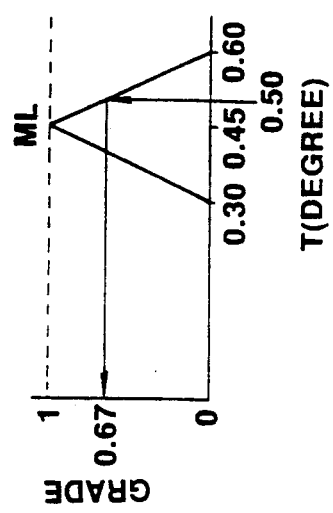
Figure 12C:
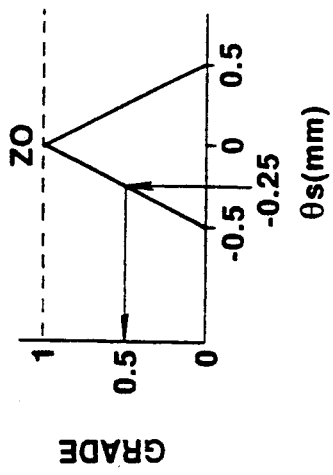

In addition, the equation (6) is solved as illustrated in FIG. 12, and a grade of solution is represented by $Y_n+1=0.5$ when smaller one of $\theta_s=0.5$ and $T=0.67$ is selectively taken.

Figure 13A:
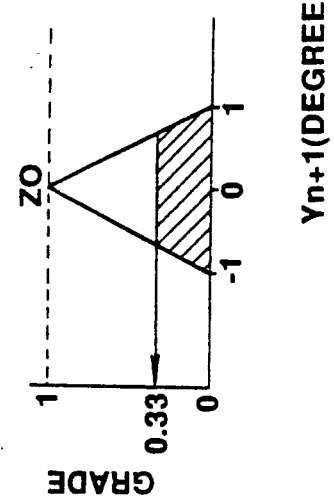
Figure 13B:
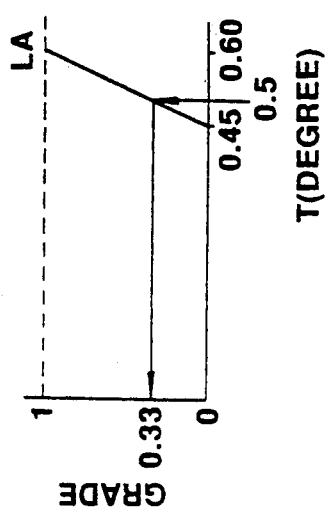
Figure 13C:
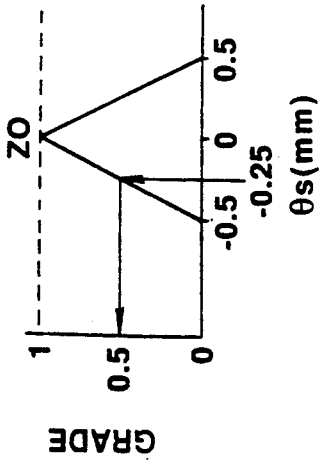

Additionally, the equation (7) is solved as illustrated in FIG. 13, and a grade of solution is represented by $Y_n+1=0.33$ when smaller one of $\theta_s=0.5$ and $T=0.33$ is selectively taken.

Figure 14:
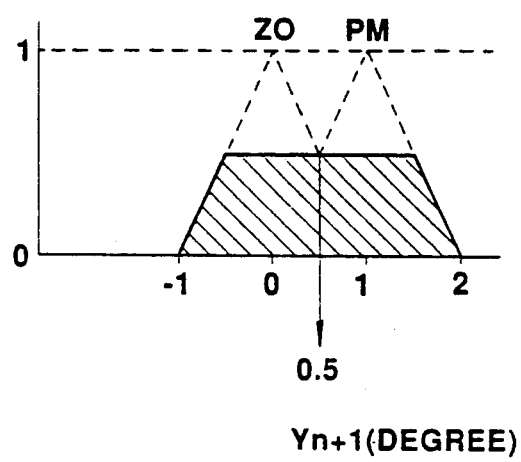

Subsequently, when a maximum value is selectively taken among the above four values of $Y_n+1$ and a final output representative of $Y_n+1$ is obtained by employing the gravity center method as illustrated in FIG. 14, a grade of solution is represented by $Y_n+1=0.5$ degree.

According to the embodiment of the present invention, the steering sensitivity T is calculated by using $\Delta\theta_{pn}/Y_n$, and moreover, using only the value derived from the present sampling operation. Alternatively, the steering sensitivity T may be calculated in accordance with the following equations (8) and (9) by using the values derived from several sampling operations performed in the past before the present sampling operation.

$$T = (\Delta\theta_{pn}-2 + \Delta\theta_{pn}-1 + \Delta\theta_{pn})/(Y_n-2 + Y_n-1 + Y_n) \quad (8)$$

$$T = (\Delta\theta_{pn}-2/Y_n-2) + (\Delta\theta_{pn}-1/Y_n-1) + (\Delta\theta_p/Y_n) \quad (9)$$

The present invention has been described above with respect to the pressuretight pilot head but it may equally be applied to an excavating type pilot head. Additionally, the present invention may be applied to an underground excavator for which pipes each having a larger diameter are used.

INDUSTRIAL APPLICABILITY

The present invention is advantageously applied to an underground excavator such as an underground excavator having pipes each having a smaller diameter used therefor so as to allow excavating operations to be performed in industrial fields in which pipes such as city water pipes, sewage pipes, power cable pipes are laid in non-opened locations, i.e., a dug or excavated locations.

We claim:

1. An apparatus for controlling the direction of displacement of an underground excavator including a turnable jack to perform excavating operations in the underground region while controlling the direction of the same by turnably displacing a pilot jack, wherein said apparatus comprises;

first detecting means for detecting horizontal deviation of said underground excavator relative to a planned line for said excavating operations, vertical deviation of the same, a pitching angle assumed by said underground excavator and a yawing angle assumed by the same, second detecting means for detecting a quantity of turnable displacement of said underground excavator caused by said turnable jack not only in the vertical direction but also in the horizontal direction, first calculating means for determining a corrected pitching angle based on said pitching angle and said vertical deviation detected in the above-defined manner, second calculating means for determining a corrected yawing angle based on said yawing angle and said horizontal deviation detected in the above-defined manner, third calculating means for determining a difference between the preceding pitching angle and the present pitching angle, and moreover, determining a steering sensibility sensible in the vertical direction based on said detected quantity of turnable displacement of said underground excavator in the vertical direction, fourth calculating means for determining a steering sensibility sensible in the horizontal direction based on a difference between the preceding yawing angle and the present yawing angle as well as said detected quantity of turnable displacement of said underground excavator in the horizontal direction, first fuzzy controlling means for determining a quantity of next turnable actuation of said turnable jack in the vertical direction in accordance with fuzzy rules in response to outputs from said first calculating means and said third calculating means, said fuzzy rules being preset such that said corrected pitching angle and said steering sensibility sensible in the vertical direction determined in the above-defined manner are taken as premise variables and said quantity of next turnable actuation of said turnable jack in the vertical direction is taken as a conclusion variable, and second fuzzy controlling means for determining a quantity of next turnable actuation of said turnable jack in the horizontal direction in accordance with fuzzy rules in response to outputs from said second calculating means and said fourth calculating means, said fuzzy rules being preset such that said corrected yawing angle and said steering sensibility sensible in the horizontal direction determined in the above-defined manner are taken as premise variables and said quantity of next turnable actuation of said turnable jack in the horizontal direction is taken as a conclusion variable.

2. An apparatus for controlling the direction of displacement of an underground excavator including a turnable jack to perform excavating operations in the underground region while controlling the direction of the same by turnably displacing a pilot jack, wherein said apparatus comprises;

first detecting means for detecting horizontal deviation of said underground excavator relative to a planned line for said excavating operations, vertical deviation of the same, a pitching angle assumed by said underground excavator and a yawing angle assumed by the same, second detecting means for detecting a quantity of turnable movement of said underground excavator caused by said turnable jack not only in the vertical direction but also in the horizontal direction, first calculating means for determining a corrected pitching angle based on said pitching angle and said vertical deviation detected in the above-defined manner, second calculating means for determining a corrected yawing angle based on said yawing angle and said horizontal deviation detected in the above-defined manner, third calculating means for determining a difference between the preceding pitching angle and the present pitching angle as well as said detected quantity of turnable displacement of said underground excavator during excavating operations performed by several times in the past, and moreover, determining a steering sensibility sensible in the vertical direction based on the values derived from said several determinations, fourth calculating means for determining a difference between the preceding yawing angle and the present yawing angle as well as said quantity of turnable displacement of said underground excavator during excavating operations performed by several times in the past, and moreover, determining a steering sensibility sensible in the horizontal direction based on the values derived from said several determinations, first fuzzy controlling means for determining a quantity of next turnable actuation of said turnable jack in the vertical direction in accordance with fuzzy rules in response to outputs from said first calculating means and said third calculating means, said fuzzy rules being preset such that said corrected pitching angle and said steering sensibility sensible in the vertical direction determined in the above-defined manner are taken as premise variables and said quantity of next turnable actuation of said turnable jack in the vertical direction is taken as a conclusion variable, and second fuzzy controlling means for determining a quantity of next turnable actuation of said turnable jack in the horizontal direction in accordance with fuzzy rules in response to outputs from said second calculating means and said fourth calculating means, said fuzzy rules being preset such that said corrected yawing angle and said steering sensibility sensible in the horizontal direction determined in the above-defined manner are taken as premise variables and said quantity of next turnable actuation of said turnable jack in the horizontal direction is taken as a conclusion variable.

* * * * *